(12) United States Patent
Donatelli

(10) Patent No.: US 7,320,751 B2
(45) Date of Patent: Jan. 22, 2008

(54) ADAPTER FOR FILTER CARTRIDGE

(75) Inventor: Christopher A. Donatelli, Macungie, PA (US)

(73) Assignee: MPC, Inc., Wilmington, DE (US)

( * ) Notice: Subject to any disclaimer, the term of this patent is extended or adjusted under 35 U.S.C. 154(b) by 387 days.

(21) Appl. No.: 10/894,905

(22) Filed: Jul. 20, 2004

(65) Prior Publication Data
US 2006/0016742 A1 Jan. 26, 2006

(51) Int. Cl.
B01D 35/14 (2006.01)

(52) U.S. Cl. .................... 210/232; 210/493.2

(58) Field of Classification Search ........... 210/232, 210/493.2
See application file for complete search history.

(56) References Cited

U.S. PATENT DOCUMENTS

| 4,104,170 A |  | 8/1978 | Nedza | 210/487 |
|---|---|---|---|---|
| 4,211,439 A | * | 7/1980 | Moldestad | 285/27 |
| 4,280,723 A | * | 7/1981 | Moldestad | 285/376 |
| 4,521,309 A |  | 6/1985 | Pall | 210/493.2 |
| 4,853,234 A |  | 8/1989 | Bentley et al. | 426/77 |
| 4,904,382 A | * | 2/1990 | Thomsen | 210/236 |
| 5,035,797 A | * | 7/1991 | Janik | 210/232 |
| 5,766,463 A | * | 6/1998 | Janik et al. | 210/232 |
| 2006/0016742 A1 | * | 1/2006 | Donatelli | 210/232 |

FOREIGN PATENT DOCUMENTS

WO 02/13944 * 2/2002

OTHER PUBLICATIONS

Instructions for GE Part #215C1107P002 © General Electric Company, 2 pages, no date.

* cited by examiner

Primary Examiner—Thomas M. Lithgow
(74) Attorney, Agent, or Firm—Woodcock Washburn LLP

(57) ABSTRACT

An adapter for a water supply system includes castlellations around the periphery of the mounting hub. The castellations eliminate the continuous sealing surface required for a standard filter end cap to effective seal to the adapter. The mounting hub has ribs on the internal periphery to prevent insertion of filter cartridge end caps with a flat O ring seal or with an O ring seal around the periphery thereof.

6 Claims, 5 Drawing Sheets

ADAPTER FOR FILTER CARTRIDGE

FIELD OF THE INVENTION

This invention relates to an adapter for a filter cartridge and more particularly to an adapter which reduces accidental insertion of the wrong cartridge in a filter system.

BACKGROUND OF THE INVENTION

Filters are widely used to remove contaminates from a fluid stream, gas or liquid. One popular type of filter which is adaptable to both industrial and non-industrial usage is the so called "cartridge" filter. Such filters are found, for instance, in recirculation systems for industrial plating baths and swimming pools.

Filter cartridges commonly include a tubular filter element whose open ends are closed off by end caps. The tubular filter element is of filter sheet material, which may or may not be corrugated. The filter element is supported on an internal core or an internal support structure. The fluid flow is outside in or inside out.

In many applications it is important that the correct filter cartridge be installed in the filter system. In industrial applications, such as pharmaceutical manufacture, semiconductor fabrication and in ultra-pure water laboratories, it is critically important that the correct filter cartridge be installed when replacing the cartridge.

Many houses now have "point of entry" water filters. These pre-filters protect the water system from dirt and sand. The water system may include water softeners and other elements which must be protected from contaminants. To preserve the integrity of the water system, the proper filter must be installed. Many filter cartridges look alike but it is important to install the proper filter.

It is an object of the present invention to provide an adapter which helps insure that the correct filter cartridge is installed.

SUMMARY OF THE INVENTION

In accordance with the present invention an adapter for a filter cartridge prevents connection of the wrong filter to the adapter.

In accordance with one aspect of the invention the adapter has a mounting hub with castellations around the periphery of the mounting hub to prevent the adapter from sealing with a standard flat gasket cartridge end cap.

Further in accordance with the invention, the adapter has ribs on the internal periphery of the mounting hub to prevent insertion of a cartridge end cap of the type having an O ring seal around the periphery of the end cap.

In one embodiment the castellations are a series of notches along the leading edge and around the periphery of said mounting hub. The castellations eliminate the continuous sealing surface required for a standard filter end cap to effectively seal The adapter is connected to a supply of liquid or gas. The other end of the adapter seals to the end cap of a filter cartridge. The castellations and ribs on the adapter preserve the integrity of the filter system by ensuring that the correct filter is installed.

The foregoing and other objects, features and advantages of the invention will be better understood from the more detailed description and appended claims.

DETAILED DESCRIPTION OF ILLUSTRATIVE EMBODIMENTS

FIGS. 1-7 show an adapter 10 to be connected to a supply of fluid. The adapter 10 has a mounting hub 12. Castellations around the periphery of the mounting hub 12 include notches 14-20. The notches are along the leading edge and around the periphery of the mounting hub. The castellation eliminate the continuous sealing surface required for a standard filter open end cap to effectively seal to the adapter.

A connector for securing the adapter to a supply of fluid includes groves 22. O rings are placed in the grooves. A clamp is used to secure the connector to the supply of fluid.

Three ribs 24 are positioned on the internal periphery of the mounting hub. These ribs prevent insertion of a standard filter cartridge end cap with a peripheral O ring seal.

Figure 3:
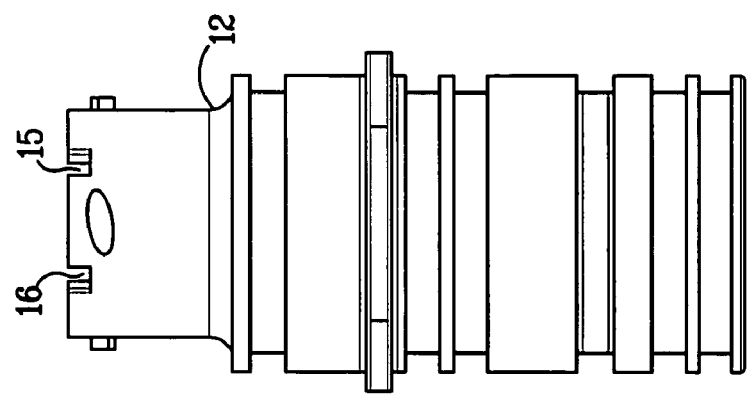
FIG. 3 is a side elevation view of the adapter.
Figure 2:
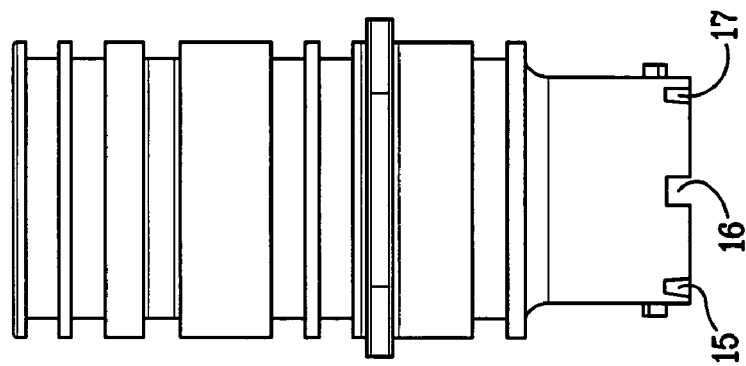
FIG. 2 is a front elevation view of the adapter.
Figure 1:
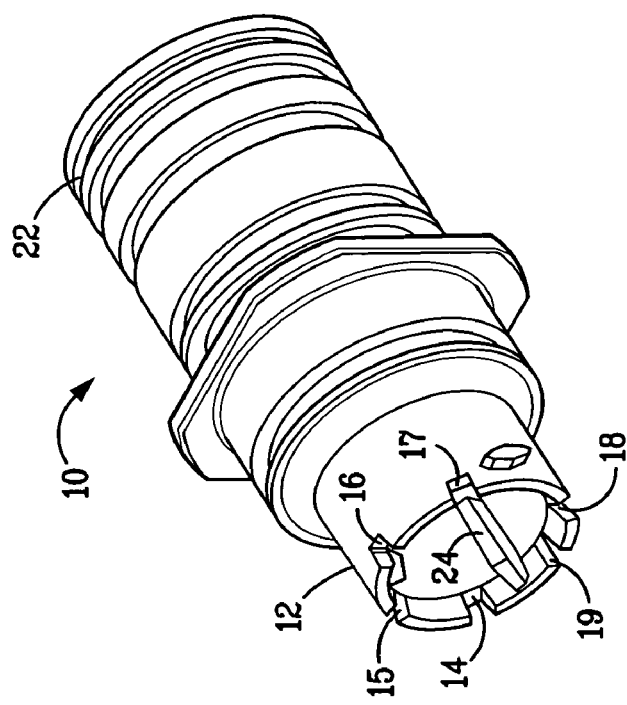
FIG. 1 is a perspective view of the adapter.
Figure 4:
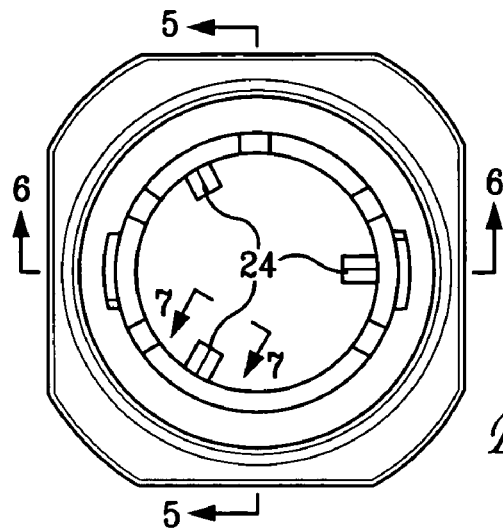
FIG. 4 is an end view of the adapter.
Figure 5:
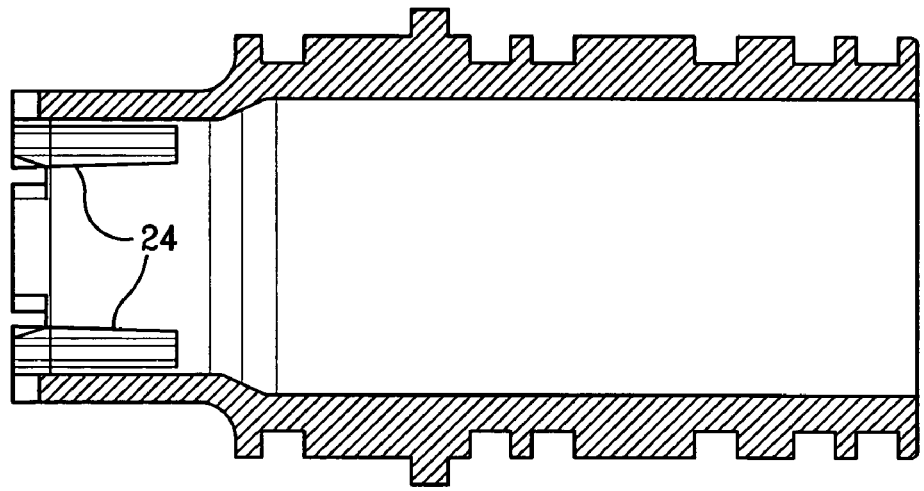
FIG. 5 is a sectional view on the section A-A of FIG. 4.
Figure 6:
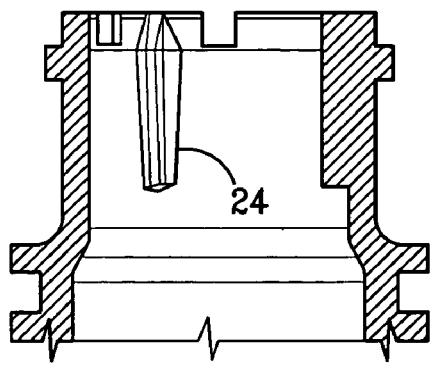
FIG. 6 is a sectional view of the mounting hub on the section B-B of FIG. 4.
Figure 7:
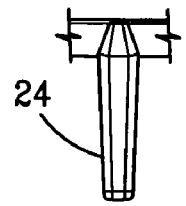
FIG. 7 shows a rib on the view C-C of FIG. 4.
Figure 8:
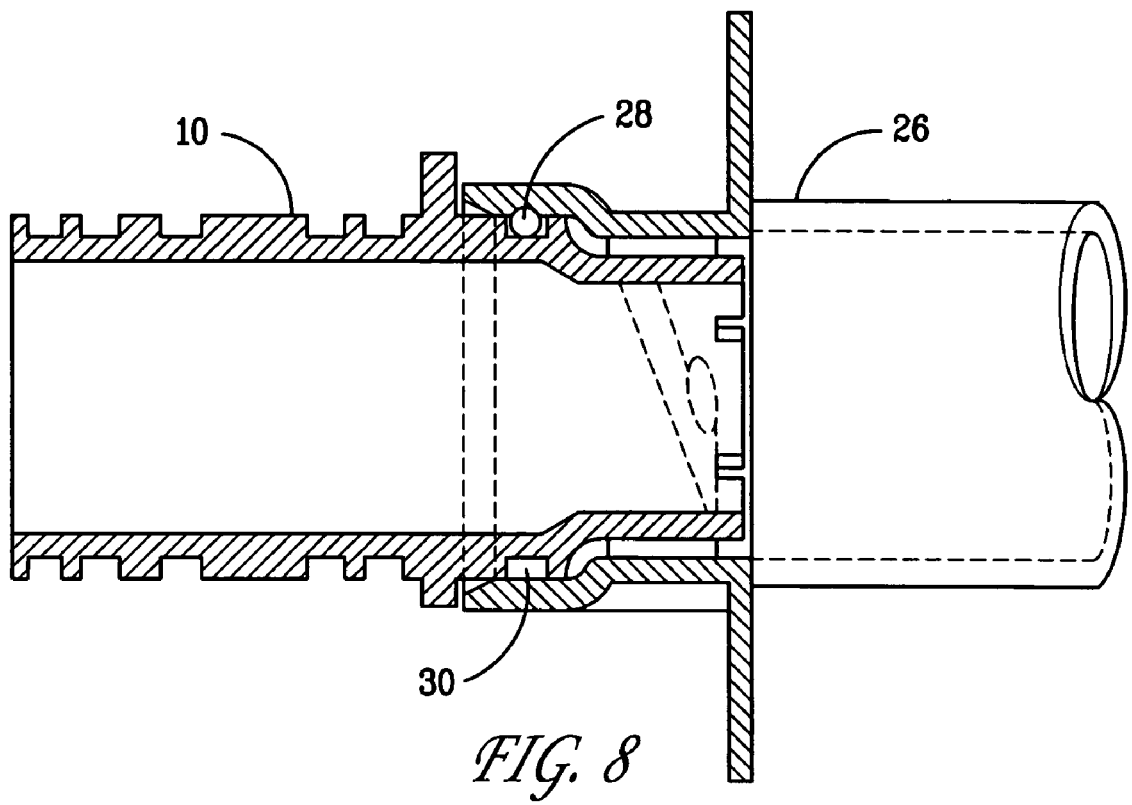
FIG. 8 is a partial section of the adapter and the cartridge housing end cap.
Figure 8A:
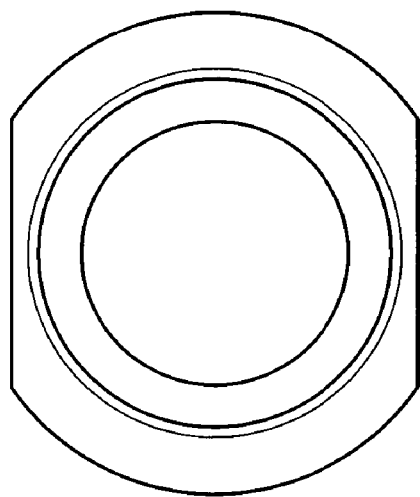
FIG. 8A is an end view of the adapter shown in FIG. 8.
Figure 9:
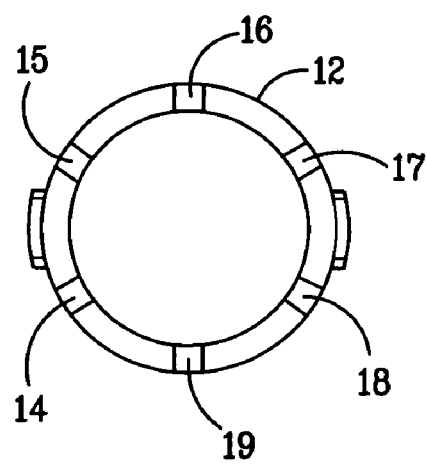
FIG. 9 is an end view of FIG. 8 showing the adapter.

FIGS. 8, 8A and 9 show the adapter of the present invention connected to the end cap of a filter cartridge. Adapter 10 is sealed to the end cap 26 by the O ring 28 which is in a groove 30 around the periphery of adapter 10.

Figure 10:
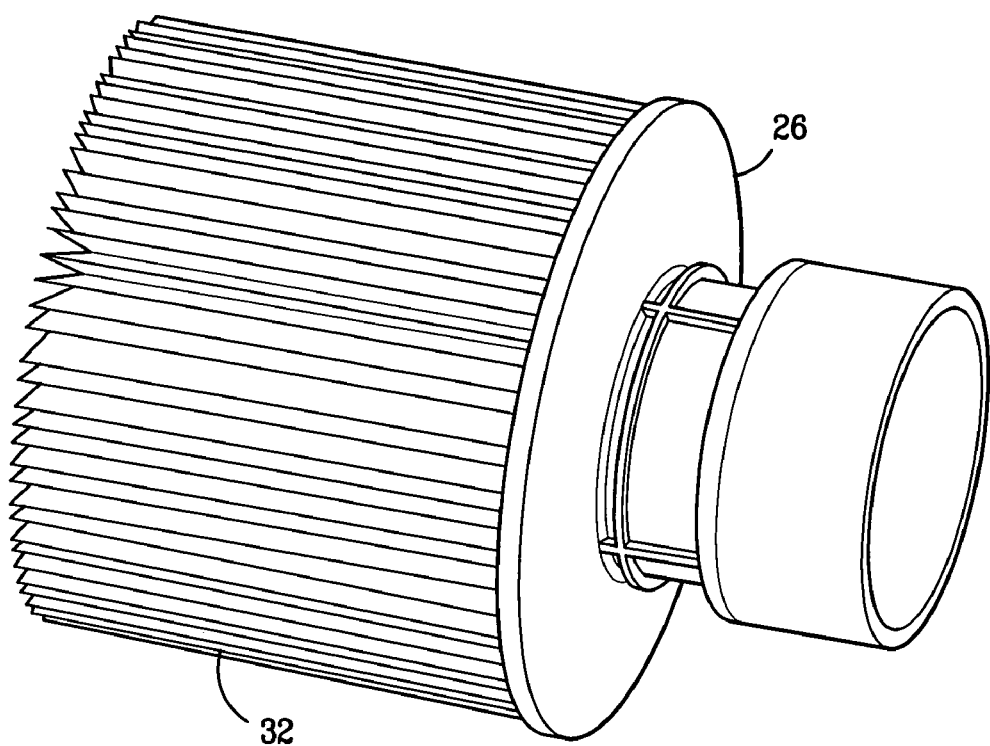
FIG. 10 shows the end cap for the filter cartridge in juxtaposition to the filter media.

FIG. 10 shows the end cap 26 of the filter cartridge in juxtaposition to the filter media 32.

Figure 11:
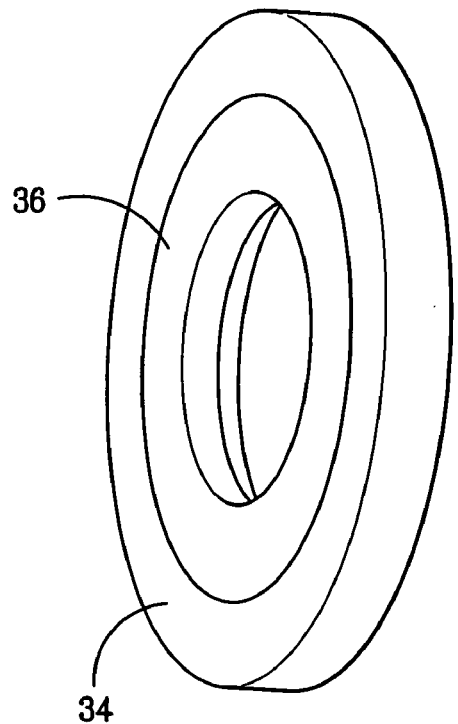
FIG. 11 shows a prior art end cap with a flat gasket.
Figure 12:
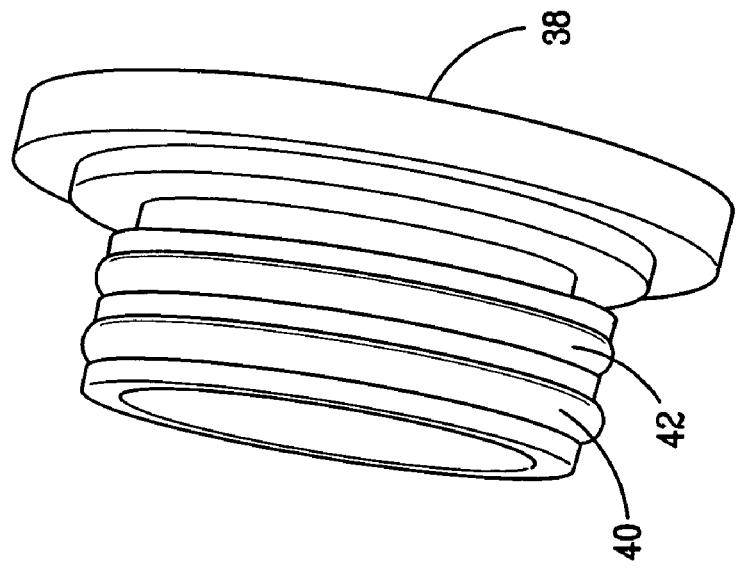
FIG. 12 shows a prior art end cap with O ring peripheral seals.

FIG. 11 shows a typical standard prior art end cap. The end cap 34 has a flat gasket 36 which seals the cartridge to the adapter. The castellations on the periphery of the adapter of the present invention prevent sealing to a prior art end cap of this type FIG. 12 shows a prior art end cap 38 with two O rings 40 and 42 which seal the end cap to the adapter. The ribs 24 in the adapter of the present invention prevent insertion of an end cap of the type shown in FIG. 12.

Figure 13:
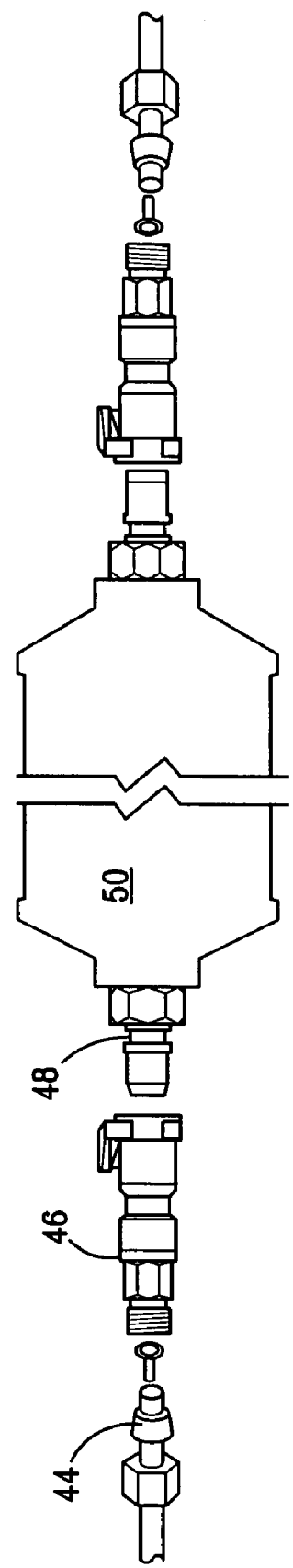
FIG. 13 shows a prior art water taste filter system.

FIG. 13 shows a typical water taste filter of the prior art. As shown in FIG. 13 a supply of water 44 is connected to adapter 46. Adapter 46 is connected to the end plate 48 of a conventional filter cartridge 50.

Other modifications or applications will be apparent to those skilled in the art. The appended claims therefore cover all such modifications and applications which are within the true spirit and scope of the invention.

What is claimed:

1. A filter system comprising:
an adapter having a mounting hub;
castellations around the periphery of said mounting hub; and
a filter cartridge having art end cap with a sealing surface which forms a seal with said adapter;

said castellations providing a discontinuous sealing surface with a flat filter end cap thereby preserving the integrity of the system by ensuring that the correct filter cartridge is installed.

2. The filter system recited in claim 1 wherein said adapter has ribs on the internal periphery of said mounting hub.

3. The filter system recited in claim 1 and an O ring on the external periphery of said adapter, said filter cartridge having an end cap which fits over said outer periphery of said adapter with a seal between said adapter and said end cap provided by said O ring.

4. The filter system recited in claim 1 and a supply of fluid to be filtered, wherein said adapter has a connector for securing said adapter to said supply of fluid.

5. The system recited in claim 1 wherein said castellations are a series of notches along the leading edge and around the periphery of said mounting hub.

6. The system recited in claim 5 wherein said adapter is part of an assembly having a head and said castellations are located in the underside of said head.

* * * * *